US011303700B2

(12) United States Patent
Reisbick

(10) Patent No.: US 11,303,700 B2
(45) Date of Patent: Apr. 12, 2022

(54) MULTI-TENANT ROUTING GATEWAY FOR INTERNET-OF-THINGS DEVICES

(71) Applicant: DISH Wireless L.L.C., Englewood, CO (US)

(72) Inventor: Richard Reisbick, Westminster, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 17/229,237

(22) Filed: Apr. 13, 2021

(65) Prior Publication Data

US 2021/0329062 A1   Oct. 21, 2021

Related U.S. Application Data

(60) Provisional application No. 63/010,123, filed on Apr. 15, 2020.

(51) Int. Cl.
| | |
|---|---|
| *H04L 29/08* | (2006.01) |
| *H04L 67/10* | (2022.01) |
| *H04L 67/12* | (2022.01) |
| *G16Y 10/75* | (2020.01) |

(Continued)

(52) U.S. Cl.
CPC ............ *H04L 67/10* (2013.01); *G16Y 10/75* (2020.01); *G16Y 40/30* (2020.01); *H04L 45/02* (2013.01); *H04L 67/12* (2013.01)

(58) Field of Classification Search
None
See application file for complete search history.

(56) References Cited

U.S. PATENT DOCUMENTS

2017/0331887 A1* 11/2017 Fishler ............... H04L 63/0428
2018/0261070 A1   9/2018 Stevens et al.

FOREIGN PATENT DOCUMENTS

KR    101 926 367 B1    12/2018

OTHER PUBLICATIONS

Shacham, N. et al. "An algorithm for optimal multicast of multimedia streams." Proceedings of IEEE INFOCOM '94: The Conference on Computer Communications. vol. 2, pp. 856-864. IEEE Computer Society Press (Year: 1994).*

(Continued)

*Primary Examiner* — Jeffrey R Swearingen
(74) *Attorney, Agent, or Firm* — Kilpatrick Townsend & Stockton LLP

(57) ABSTRACT

Novel techniques are described for gateway routing and/or processing of multi-tenant Internet-of-Things (IoT) device data streams. For example, a single IoT routing gateway can be used to route device data streams from IoT devices of multiple customers according to rule-based routing tiers. The routing tiers define routing protocols, including which communication technologies to use for transmission of the device data streams over a cloud network to remote servers. In some cases, the routing tiers further define processing protocols to facilitate rule-based edge processing (and/or remote processing) of some or all device data streams. Some routing tiers can define a primary and one or more secondary solution for routing and/or processing, according to customer-defined rules. In some cases, the routing tiers further enable rule-based control of interconnectivity among IoT devices.

20 Claims, 4 Drawing Sheets

(51) Int. Cl.
*H04L 45/02* (2022.01)
*G16Y 40/30* (2020.01)

(56) References Cited

OTHER PUBLICATIONS

International Search Report and Written Opinion for PCT/US2021/027174 dated Jul. 7, 2021, all pages.

\* cited by examiner

MULTI-TENANT ROUTING GATEWAY FOR INTERNET-OF-THINGS DEVICES

CROSS-REFERENCE TO RELATED APPLICATIONS

This application claims priority to U.S. Provisional Patent Application No. 63/010,123, filed on Apr. 15, 2020, entitled "Routing Gateway For Internet-Of-Things," the disclosure of which is hereby incorporated by reference in its entirety for all purposes.

FIELD

This invention relates generally to Internet-of-Things (IoT) device networks, and, more particularly, to automatically tiered handling and routing of multi-tenant IoT device data via a routing gateway.

BACKGROUND

Internet-of-Things (IoT) devices are becoming ubiquitous. In many cases, such IoT devices are relatively simple devices with connectivity to an IoT network. As one example, a parking lot may have a large number of distributed parking sensors to determine whether parking spots are occupied or vacant. As another example, a large greenhouse operation may have many different types of sensors and/or actuators for measuring soil conditions, humidity, temperature, status of windows and doors (e.g., open or closed), etc. In either example, the sensors may transmit their data to a dedicated hub, which may be coupled with a public or private network connection, thereby allowing remote monitoring and/or control of the sensors.

Currently, deployments of IoT devices tend to be limited in a number of ways. For example, implementing an IoT environment by a particular entity can involve both deploying a number of IoT devices typically and deploying one or more hubs for collecting the IoT device data. Often, deploying a particular hub for a particular IoT device deployment can involve configuring the hub for particular design constraints and/or features. For example, different IoT devices may communicate on different frequency bands; it may be desirable to make sure that communications from (or to) some IoT devices are not discoverable by other IoT devices (e.g., owned or operated by a different entity) for security, interference, and/or other reasons; data from different IoT devices may be received at different intervals, such as continuously, periodically, occasionally, etc.; different types of data received from different IoT devices may have different types of associated urgency, bandwidth, security, processing, etc.; and/or different communication frameworks (e.g., technologies, protocols, etc.) can be more or less suited for communications of different types of IoT device data and/or with different types of entities; etc. As such, deploying the hubs can often involve investing in designing, building, purchasing, installing, and/or otherwise creating a custom solution for gathering, processing, retransmitting, and/or otherwise handling IoT device data.

BRIEF SUMMARY

Among other things, embodiments provide novel systems and methods for gateway routing and/or processing of multi-tenant Internet-of-Things (IoT) device data streams. For example, a single IoT routing gateway can be used to route device data streams from IoT devices of multiple customers (i.e., tenants) according to rule-based routing tiers. The routing tiers define routing protocols, including which communication technologies to use for transmission of the device data streams over a cloud network to remote servers. In some cases, the routing tiers further define processing protocols to facilitate rule-based edge processing (and/or remote processing) of some or all device data streams. Some routing tiers can define a primary and one or more secondary solution for routing and/or processing, according to customer-defined rules. In some cases, the routing tiers further enable rule-based control of interconnectivity among IoT devices.

According to one set of embodiments, a multi-tenant Internet-of-Things (IoT) gateway routing system is provided. The system includes a routing subsystem, a mapping subsystem, and a data store. Some embodiments further include an edge processing subsystem. The routing subsystem is configured to communicatively couple with a cloud network via multiple communication technologies, and to couple with multiple IoT devices via an IoT network, so as to: receive input device data streams from the IoT devices via the IoT network; and transmit output device data streams to the cloud network, each output device data stream generated from at least a respective input device data stream of the input device data streams, and each of at least a portion of the output device data streams being associated with a respective communication technology of the plurality of communication technologies and being transmitted in accordance with the respective communication technology. The data store has, stored thereon, a customer device map that maps each customer of a plurality of customers with a respective subset of the plurality of IoT devices, and a customer tiering map that maps the plurality of customers with a plurality of routing tiers. The mapping subsystem is coupled with the routing subsystem and the data store, and is configured, for each input device data stream, to: determine a source IoT device of the IoT devices as having originated the input device data stream; identify a particular customer of the customers as associated with the source IoT device according to the customer device map; and assign a particular routing tier of the routing tiers to the input device data stream according to the customer tiering map and the particular customer, the particular routing tier defining a particular routing protocol for the input device data stream, thereby associating the input device data stream with the respective communication technology.

According to another set of embodiments, a method is provided for multi-tenant Internet-of-Things (IoT) gateway routing. The method includes: receiving, by an IoT gateway routing system, a plurality of input device data streams from a plurality of IoT devices via an IoT network; and for each input device data stream: determining, by the IoT gateway routing system, a source IoT device of the plurality of IoT devices as having originated the input device data stream; identifying, by the IoT gateway routing system, a particular customer of a plurality of customers as associated with the source IoT device according to a customer device map; assigning, by the IoT gateway routing system, a particular routing tier of a plurality of routing tiers to the input device data stream according to a customer tiering map and the particular customer, the particular routing tier defining a particular routing protocol for the input device data stream, thereby associating the input device data stream with a respective communication technology; and transmitting, by the IoT gateway routing system, a respective output stream to the cloud network in accordance with the respective communication technology, the respective output stream generated from the input device data stream.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
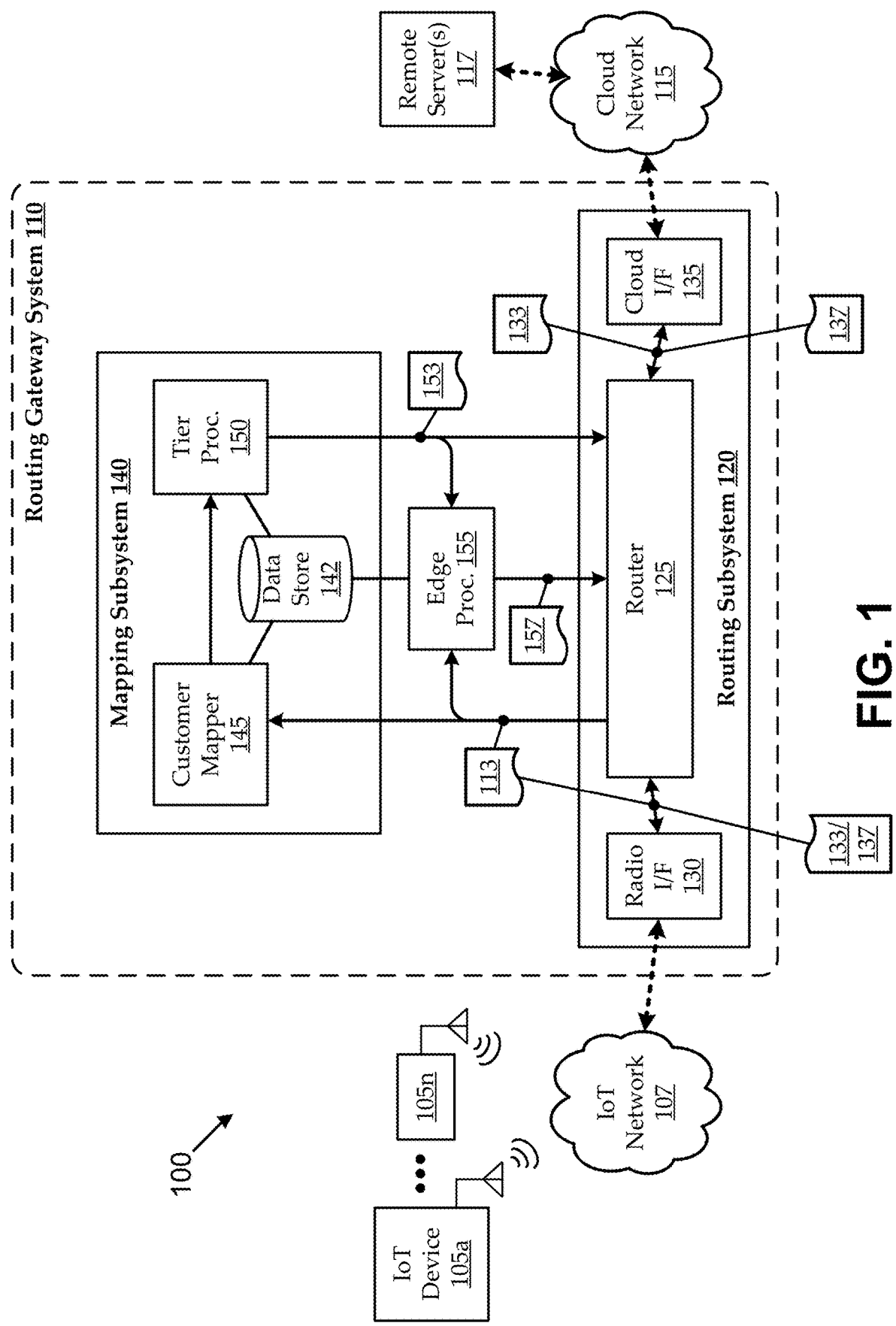
FIG. 1 shows a network environment as a context for various embodiments.

Turning to FIG. 1, a network environment 100 is shown as a context for various embodiments. The network environment 100 includes a multi-tenant Internet-of-Things (IoT) gateway routing system 110 coupled between an IoT network 107 and a cloud network 115. As illustrated, the multi-tenant IoT gateway routing system 110 has a routing subsystem 120 and a mapping subsystem 140. In some embodiments, the multi-tenant IoT gateway routing system 110 also includes an edge processing subsystem 155. In general, embodiments of the multi-tenant IoT gateway routing system 110 permit rule-based collection, processing, and/or routing of data from large numbers of IoT devices 105 associated with multiple different customer entities (i.e., tenants).

Embodiments of the routing subsystem 120 are configured to communicatively couple with multiple IoT devices 105 via the IoT network 107. The IoT devices 105 can include any suitable types of devices, such as sensor devices, actuator devices, etc. Typically, the IoT devices 105 include relatively simple devices, each configured to perform one measurement or actuation task (or a limited number of such tasks), and each having an antenna and/or other means of communication with the IoT network 107. In one implementation, the IoT network 107 is a 433 Megahertz radio network. In another implementation, the IoT network 107 is a 915 Megahertz radio network. In another implementation, the IoT network 107 is a radio frequency network operating in the ultra-high-frequency (UHF) spectrum band of 300 Megahertz to 3 Gigahertz. In other implementations, the IoT network 107 includes multiple radio networks operating in one or more radiofrequency bands. In some implementations, the IoT network 107 is only a wireless network, such that all of the IoT devices 105 are in communication with the multi-tenant IoT gateway routing system 110 via wireless connections (e.g., using antennas). In other implementations, the IoT network 107 includes one or more wired communication links, such that at least a portion of the IoT devices 105 are in communication with the multi-tenant IoT gateway routing system 110 via one or more wired connections.

Embodiments of the routing subsystem 120 are configured to communicatively couple with multiple remote servers 117 via the cloud network 115. In some implementations, the cloud network 115 is the Internet, and/or another public network. In other implementations, the cloud network 115 includes one or more private networks. The cloud network 115 can include any suitable wired and/or wireless communication links. These connections with the cloud network 117 can be via multiple communication technologies. As used herein, different "communication technologies" refer to different forms of connectivity with a communications network, typically associated with one or more particular frequency bands, protocols, and/or the like. Implementations of the multi-tenant IoT gateway routing system 110 can support at least two such communication technologies. For example, the multi-tenant IoT gateway routing system 110 can support two or more of a narrow-band IoT (nb-IoT) network technology, a long-term evolution (LTE) network technology, a wireless fidelity (WiFi) network technology, an Ethernet network technology, etc. Each of those illustrative communication technologies can have (and/or support) one or more associated packet formats, protocol stacks, bandwidth, coding schemes, network links, etc.

In some implementations, access to the multi-tenant IoT gateway routing system 110 is a service offering of a gateway service provider, and at least one of the remote servers 117 is associated with the gateway service provider. In some such implementations, the gateway service provider has no commercial association with (i.e., does not own, rent, or otherwise have commercial control over) any of the IoT devices 105. In some such implementations, the service offering of the gateway service provider includes various types of accessibility for remote servers 117 associated with customers. For example, each customer may have an associated one or more remote servers 117, multiple customer may have access to a shared one or more remote servers 117, etc. A customer can be provided with functionality via communications between one or more remote servers 117 and the multi-tenant IoT gateway routing system 110 (e.g., according to contractual provisions). The remote servers 117 (e.g., of the gateway service provider and/or the customers) can be used to perform various functions, such as to perform remote monitoring of data from some or all IoT devices 105 associated with a customer, to perform remote control of some or all IoT devices 105 associated with a customer, to manage interconnectivity among some or all IoT devices 105 associated with a customer, to define mappings (e.g., customer sensor maps, customer tiering maps, etc.), and/or other functionality.

Embodiments of the multi-tenant IoT gateway routing system 110 receive input device data streams 113 from the IoT devices 105 via the IoT network 107. For example, the routing subsystem 120 includes a router 125 coupled with a radio interface 130 and a cloud interface 135. The radio interface 130 provides the multi-tenant IoT gateway routing system 110 with an interface to the IoT network 107, and the cloud interface provides the multi-tenant IoT gateway routing system 110 with an interface to the cloud network 115. The radio interface 130 and the cloud interface 135 can include any suitable physical and/or logical interfaces, such as antennas, physical ports, connectors, transceivers, etc. The input device data streams 113 can be passed by the radio interface 130 to the router 125. The router 125 can pass the input device data streams 113 to the mapping subsystem 140. Though illustrated and described throughout as input device data streams 113, the input device data streams 113 can be modified in any suitable manner by any suitable components prior to being passed to other components. For example, the radio interface 130 can convert the received raw data stream into a data stream that is configured for processing by components of the multi-tenant IoT gateway routing system 110. As another example, the router 125 can adapt the input device data streams 113 for use by particular components. In some embodiments, components of the multi-tenant IoT gateway routing system 110 handle some or all of the input device data streams 113 without any awareness of the contents of the input device data streams 113. In one such embodiment, packet header information, metadata, and/or the like is stripped from the input device data streams 113 and used for all functions of the mapping subsystem 140. In such an embodiment, the input device data streams 113 communicated to the mapping subsystem 140 may not be the input device data streams 113 as received from the IoT devices 105; rather the mapping subsystem 140 may receive only certain header data or metadata, or the like. For example, some implementations of the mapping subsystem 140 can operate only with knowledge of the source IoT device 105 associated with each input device data stream 113.

Embodiments of the mapping subsystem 140 are coupled with the routing subsystem 120 to receive the input device data streams 113. The mapping subsystem 140 can include a customer mapper 145 and a tier processor 150. The mapping subsystem 140 can further be coupled with (e.g., as a separate component, or can include) a data store 142. The data store 142 can be implemented using any suitable type of memory, including a hard-disk drive, solid state memory, and/or other non-transient memories. The data store 142 can have, stored thereon, a customer device map that maps each customer (e.g., of one or more customers) with a respective subset of the IoT devices 105. For example, a single multi-tenant IoT gateway routing system 110 can be used as a routing gateway for IoT devices 105 associated with multiple customers, such that each customer is associated with a subset (e.g., of disjoint or overlapping subsets) of the IoT devices 105. For each input device data stream 113, the customer mapper 145 receives the input device data stream 113 and determines a source IoT device 105 of the IoT devices 105 as having originated the input device data stream 113. For example, the source IoT device 105 can be determined from packet headers, metadata, or the like. In accordance with the stored customer device map, the customer mapper 145 can identify a particular customer (e.g., of multiple customers) as associated with the source IoT device 105. For example, the identified customer is a customer that owns the IoT device 105, is authorized to receive information and/or control operation of the IoT device 105, etc.

The data store 142 can also have, stored thereon, a customer tiering map that maps each customer with one or more of multiple routing tiers. The routing tiers can direct how input device data streams 113 from the IoT devices 105 are handled by the multi-tenant IoT gateway routing system 110. For example, the routing tiers can define routing protocols, including which communication technology to use for communicating device data via the cloud network 115 (and/or via the IoT network 107), and whether and how to provide secondary routings when primary routings are unavailable; and the routing tiers can define processing protocols, including whether and how to execute edge processing on the data, and whether and how to direct remote processing of the data, etc. Each customer can contract with the gateway service provider for IoT routing services of the multi-tenant IoT gateway routing system 110. For example, each customer purchases IoT routing services connected with the multi-tenant IoT gateway routing system 110, such that the customer's IoT devices 105, and/or input device data streams 113 from those IoT devices 105, is associated with a particular one or more routing tiers.

In some implementations, routing tiers are assigned (e.g., contracted for, stored in association with, defined for, etc.) at the customer levels, such that all the IoT devices 105 (and all data from those devices) are treated in accordance with a single routing tier as indicated by the customer tiering map. For example, an input device data stream 113 is received from a particular source IoT device 105. The source IoT device 105 is identified and mapped (by the customer device map) to a mapped customer, the mapped customer is further mapped (by the customer tiering map) to a mapped routing tier, and the data can then be handled according to the mapped routing tier. In some implementations, routing tiers are assigned at the IoT device 105 level, such that each IoT device 105 for each customer is associated with a particular routing tier, as indicated by the customer tiering map. For example, an input device data stream 113 is received from a particular source IoT device 105. The source IoT device 105 is identified and mapped (by the customer device map) to a mapped customer, the mapped customer and an identifier of the source IoT device 105 are further mapped (by the customer tiering map) to a mapped routing tier, and the data can then be handled according to the mapped routing tier. In some implementations, routing tiers are assigned at the data stream level, such that each input device data stream 113 from each IoT device 105 for each customer is associated with a particular routing tier, as indicated by the customer tiering map. For example, an input device data stream 113 is received from a particular source IoT device 105. The input device data stream 113 has (or is tagged with) a stream identifier, and the source IoT device 105 has a device identifier. The source IoT device 105 is identified and mapped (by the customer device map) to a mapped customer; the mapped customer, device identifier, and stream identifier are further mapped (by the customer tiering map) to a mapped routing tier, and the data can then be handled according to the mapped routing tier. For example, each routing tier defines a routing protocol that can define any suitable information used for routing and/or otherwise handling each input device data streams 113, including one or more communication technologies to use for communicating data of the input device data streams 113 over the cloud network 115 and/or over the IoT network 107.

In some embodiments, each routing tier defines a respective one or more particular routing protocols, each associated with a respective IoT device type or category. The device types or categories can be characterized by various characteristics, such as a relative frequency of data collection, a relative urgency of data communication, etc. One illustrative routing tier (e.g., a least expensive tier) is associated with an IoT device type characterized by a relatively low frequency of data collection and a relatively low urgency of data communication. Such a routing tier can be used, for example, with an IoT device 105 configured to detect when a public trach can is full. The trash can sensor may only occasionally transmit a sensor reading (e.g., once every few hours, only when full, etc.), and the data may not be particularly urgent to the customer of the trash can sensor (e.g., a municipal sanitation department). For example, there may be little reason for concern, if it takes a few extra hours for the data to be transmitted to the customer; and the customer may therefore be unwilling to pay for higher urgency and/or certainty of receipt of such data. Another illustrative routing tier is associated with an IoT device type characterized by a relatively low frequency of data collection and a relatively high urgency of data communication. Such a routing tier can be used, for example, with an IoT device 105 configured to detect when a traffic accident occurs at a street corner. The accident sensor may only occasionally transmit a sensor reading (e.g., once every few hours, only when an accident occurs, etc.), but the data may be considered urgent to the customer of the accident sensor (e.g., a municipal emergency services department). For example, if an accident occurs, it may be critical for the customer to be informed as soon as possible; and the customer may therefore be willing to pay for higher urgency and/or certainty of receipt of such data. Another illustrative routing tier is associated with an IoT device type characterized by a relatively high frequency of data collection and a relatively high urgency of data communication. Such a routing tier can be used, for example, with an IoT device 105 configured to continually monitor a storage temperature for a volatile material; such data may be monitored continuously, and an urgent response may be desired if the data indicates values outside of some defined threshold. Any other suitable routing tiers can be defined. For example, a routing tier can be associated with an IoT device type characterized by a relatively high frequency of data collection and a relatively low urgency of data communication, such as a continuous monitoring device, where the data is used only for logging or research purposes.

Further, some routing tiers can be defined in relation to other routing tiers, combinations of IoT devices 105, and/or in any suitable manner. As one example, the IoT devices 105 include a large number of sensors and actuators associated with different components and/or customers of a large commercial greenhouse. A first IoT device 105a is a moisture sensor that monitors soil moisture in a particular location near a sprinkler head. A second IoT device 105b is an actuator for turning the sprinkler head on or off. A routing tier defines its routing protocols with respect to both IoT devices 105. Data from the first IoT device 105a is used to trigger control the second IoT device 105b. For example, the routing tier defines a routing protocol that periodically monitors soil moisture using the first IoT device 105a accordingly to a relatively high-frequency, but relatively low-urgency monitoring. If the sprinkler head is off, and the moisture data measures below some threshold value, the routing protocol directs the multi-tenant IoT gateway routing system 110 to trigger the second IoT device 105b to turn on the sprinkler head; if the sprinkler head is on, and the moisture data measures above some threshold value, the routing protocol directs the multi-tenant IoT gateway routing system 110 to trigger the second IoT device 105b to turn off the sprinkler head. However, if the sprinkler head is supposed to be off, and the data from the first IoT device 105a indicates that the soil moisture is climbing; or if the sprinkler head is supposed to be on, and the data from the first IoT device 105a indicates that the soil moisture is not climbing; the routing protocol can treat the data from the first IoT device 105a as urgent, as this indicates a potential problem with the irrigation system (e.g., leak, broken head, etc.). In such a case, the routing protocol may also be designed automatically to trigger data collection from one or more other IoT devices 105, such as one or more other soil moisture sensors, etc. As described herein, different groups of the above sensors can be associated with different customers, and the data from those sensors can be handled differently in accordance with the associated customer tiering maps, etc. Similarly, different instances of same groups of sensors can be associated with different customers, and the data from those sensors can be handled differently in accordance with the associated customer tiering maps, etc.

Embodiments of the mapping subsystem 140 can communicate routing protocol data 153 back to the router 125. In some implementations, the routing protocol data 153 is a revised instance of the input device data stream 113 having the routing protocol data 153 added as tags, packet data, metadata, etc. In other implementations, the routing protocol data 153 is communicated as a separate data stream, file, or in any other suitable manner. Responsive to receiving the routing protocol data 153, the router 125 can generate an output device data stream 133. In some embodiments, the router 125 generates a corresponding output device data stream 133 from each input device data stream 113, such that the corresponding output device data stream 133 is configured for transmission in accordance with the respective communication technology (e.g., per the routing protocol data 153). In other embodiments, multiple input device data streams 113 can be used to generate a single output device data stream 133. For embodiments where the routing protocol data 153 is added to the input device data stream 113 as metadata, packet data, etc., some such embodiments can generate output device data streams 133 simply by passing on the stream to an appropriate communication technology (e.g., by routing the data to a corresponding protocol, port, etc.). In other embodiments, the generating can involve any suitable modification of the data streams to prepare for communicating the output device data streams 133 for communication. As described herein, some implementations of the router 125 can then transmit the output device data streams 133 over the cloud network 115 to one or more remote servers 117. Other implementations of the router can transmit certain output device data streams 133 to one or more of the IoT devices 105 over the IoT network 107.

Figure 2A:
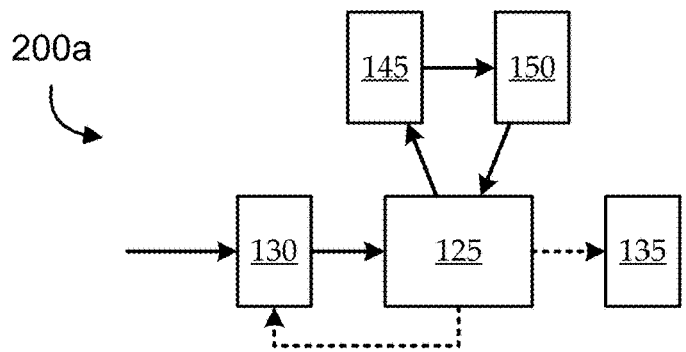
FIGS. 2A-2C show various simplified versions of a network environment, like the network environment of FIG. 1, to more clearly illustrate certain features.
Figure 2B:
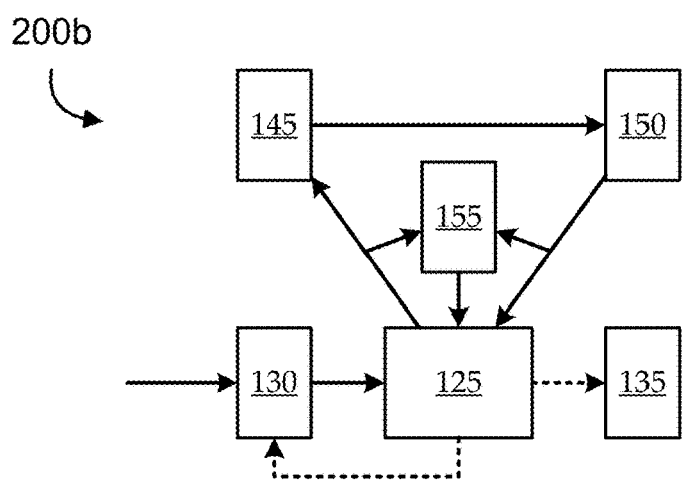
Figure 2C:
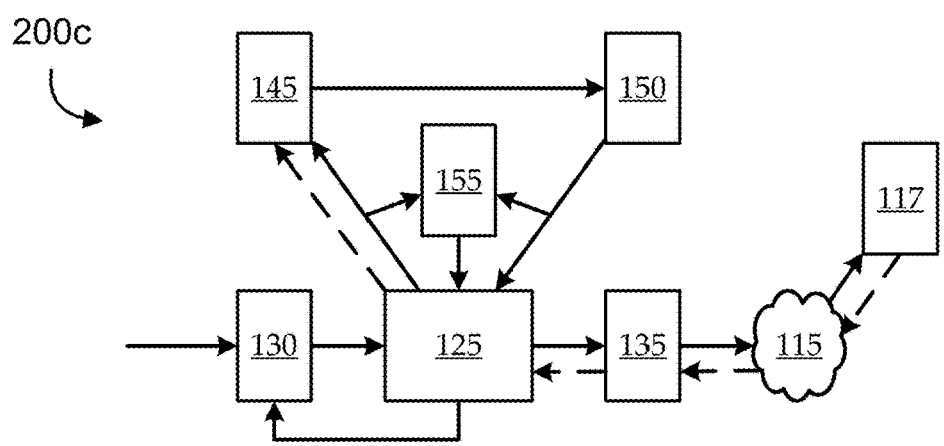

For example, FIGS. 2A-2C show various simplified versions of a network environment 200, like the network environment 100 of FIG. 1, to more clearly illustrate certain features. FIGS. 2A-2C are described with continued reference to FIG. 1. As illustrated by FIG. 2A, input device data streams 113 can be received by the radio interface 130 and passed to the router 125. The router 125 can pass the input device data streams 113 (or appropriate data parsed from those streams) to mapping subsystem 140 components, such as the customer mapper 145 and the tier processor 150, thereby associating the input device data streams 113 with rule-based routing tiers. The routing tiers indicate at least routing protocols, which are communicated back to the routing subsystem 120. The routing subsystem 120 can then use the routing protocols to determine how to route and/or otherwise handle the input device data streams 113, such as which communication technologies to use for transmitting the input device data streams 113 to the cloud network 115 via the cloud interface 135 and/or to the IoT network 107 via the radio interface 130.

It can be desirable for certain input device data streams 113 to be processed locally by the multi-tenant IoT gateway routing system 110 prior to being communicated over one or more networks. To that end, some embodiments of the multi-tenant IoT gateway routing system 110 include an edge processing subsystem 155. Some implementations of the customer tiering map have routing tiers that further define processing protocols for some or all data streams (e.g., or for some or all customers, some or all IoT devices 105, etc.). The processing protocols can direct the edge processing subsystem 155 to perform any suitable type of processing on the input device data streams 113. In some implementations, the processing protocols direct execution of mathematical functions using data of the input device data streams 113, such as by averaging data of an input device data stream 113 over time, adding or multiplying data of an input device data stream 113, mathematically combining data from multiple input device data streams 113, etc. In other implementations, the processing protocols direct evaluation of data from one or more data streams using machine learning engines, statistical processing engines, state machines, etc. As one example, a routing tier for a particular input device data stream 113 includes a processing protocol for evaluating data of the input device data stream 113 against a threshold, and to generate the output device data stream 133 in accordance with whether the data exceeds the threshold. As another example, a routing tier for a particular group of input device data streams 113 from camera and other sensor IoT devices 105 includes a processing protocol that evaluates combined image and other data from the streams using image processing and artificial neural networks, detects whether a certain object or occurrence is present in the data, and generates one or more output device data streams 133 in accordance with that detection. As another example, a routing tier for a large number of input device data streams 113 includes a processing protocol for evaluating data from parking sensor IoT devices 105 in each space of a parking lot to determine whether a parking lot is full, and to generate a trigger signal to actuate electronic signage at the parking lot via an actuator IoT device 105 to display a message indicating whether the parking lot is full, accordingly.

FIG. 2B, along with FIG. 1, illustrates such data handling with edge processing. In these and other cases, an input device data stream 113 can be received by the router 125 from a particular IoT device 105 via the radio interface 130 and the IoT network 107. The input device data stream 113 (or source IoT device 105 data) is routed to the customer mapper 145, where a customer is identified as associated with the input device data stream 113 in accordance with the customer device map. Data identifying the customer (e.g., and other information, such as a stream identifier, an IoT device identifier, etc.) is passed to the tier processor 150, where the input device data stream 113 is associated with routing protocol data 153 of a routing tier according to the customer tiering map. The routing protocol data 153 can indicate a routing protocol and a processing protocol. The input device data stream 113 and the routing protocol data 153 can be communicated to the edge processing subsystem 155, so that the edge processing subsystem 155 can process the input device data stream 113 in accordance with the processing protocol. In some cases, the result of the processing is the generation of one or more processed device data stream 157. The processed device data stream 157 can be communicated back to the router 125, and the router 125 can transmit the processed device data stream(s) 157 as one or more output device data streams 133, and/or can generate one or more output device data streams 133 from the processed device data stream(s) 157.

In some cases, transmission of the output device data streams 133 is over the cloud network 115 to one or more of the remote servers 117 in accordance with the routing protocol data 153. For example, an output device data stream 133 can indicate (e.g., include) data being detected by an IoT device 105 configured as a sensor, and can permit a remote server 117 to monitor that data. In other cases, the transmission of the output device data streams 133 is over the IoT network 107 to one or more of the IoT devices in accordance with the routing protocol data 153. Interconnectivity between IoT devices 105 can be managed in this way via the multi-tenant IoT gateway routing system 110. For example, the output device data stream 133 can indicate (e.g., include) data being communicated from a sensor IoT device 105 to an actuator IoT device 105. An input device data stream 113 is received as an input interconnectivity data stream and is routed to the mapping subsystem 140 by the routing subsystem 120. As with other input device data streams 113, the mapping subsystem 140 can map a routing tier to the input device data stream 113 that defines a routing protocol and/or processing protocol. In the case of an interconnectivity data stream, the mapping can be used to determine and/or control whether particular IoT devices 105 can be in communication with other IoT devices 105. For example, the customer mappings and corresponding routing tier mappings can be used to ensure that only those IoT devices 105 owned (e.g., or operated, under commercial control of, etc.) are able to interconnect, that certain IoT devices 105 are authorized as maser devices to control a particular one or more IoT devices 105 indicated as slave devices, etc. Such interconnectivity management can permit the multi-tenant IoT gateway routing system 110 to be used with IoT devices 105 of multiple customers, while maintaining isolation of each customer's communications from communications of other customers.

In some cases, some or all of the remote servers 117 are passive with respect to the multi-tenant IoT gateway routing system 110, such that they only receive output device data streams 133. In some such cases, one or more output device data streams 133 are effectively pushed to the remote server(s) 117 without any explicit request for the data. For example, continuously or periodically monitored sensor data, or data to which an urgent reaction may be warranted, can be pushed to remote monitoring stations. In other cases, some or all of the remote servers 117 are at least partially active with respect to the multi-tenant IoT gateway routing system 110, such that they can both receive output device data streams 133 and communicate control messages 137 to the multi-tenant IoT gateway routing system 110. The control messages 137 can be communicated from the remote servers 117 to the multi-tenant IoT gateway routing system 110 in any suitable manner, such as over the same cloud network 115 via the same cloud interface 135.

FIG. 2C, along with FIG. 1, illustrates several scenarios in which control messages 137 are communicated. In some such cases, one or more output device data streams 133 are communicated over the cloud network 115 responsive to a request by one or more remote servers 117 (e.g., the requests sent as control messages 137). For example, one or more of the remote server(s) 117 can request data from one or more IoT devices 105, the data can be obtained in accordance with the request, and the output device data stream 133 can be generated from the data responsive to the request. In some implementations, such communication remains passive with respect to the IoT devices 105. For example, the IoT devices 105 continually or periodically gather and report data to the multi-tenant IoT gateway routing system 110 using input device data streams 113, but the input device data streams 113 are only used to generate output device data streams 133 in response to requests (control messages 137) from remote servers 117. In other implementations, the multi-tenant IoT gateway routing system 110 has more active control over some or all of the IoT devices 105, while some or all remote servers 117 remain effectively decoupled from the IoT devices 105. For example, in response to a control message 137 from a particular remote server 117 (e.g., for a sensor IoT device 105 to record a data reading, for an actuator to change state, for an actuator to report its state, etc.), the multi-tenant IoT gateway routing system 110 can generate appropriate control signals for the IoT devices 105 to carry out the intent of the message from the remote server 117; such that the IoT devices 105 are still effectively under the control only of the multi-tenant gateway routing system 110. In still other implementations, some or all remote servers 117 have more direct control over some or all of the IoT devices 105 via the multi-tenant IoT gateway routing system 110. For example, the multi-tenant IoT gateway routing system 110 receives a control message 137 from a particular remote server 117 destined for a destination IoT device 105, and the multi-tenant IoT gateway routing system 110 effectively passes the control message 137 along to the destination IoT device 105; such that the IoT devices 105 are still effectively under the control only of the multi-tenant IoT gateway routing system 110.

In implementations that permit indirect or direct control (via control messages 137) of the IoT devices 105 by the remote servers 117, the multi-tenant IoT gateway routing system 110 can enforce rule-based authorization and control of such control messaging. In some embodiments, the control messages 137 are received from the remote servers 117 by the router 125 of the routing subsystem 120. As with other received messages, the routing subsystem 120 can pass a received control message 137 to the mapping subsystem 140. The mapping subsystem 140 can identify a customer associated with a source of the control message 137 and assign an appropriate routing tier. In the case of such control messages 137, the routing tier can define a routing (and/or processing) protocol to direct handling of the control message 137. For example, the customer and routing tier mappings can be used to effectively determine whether the source remote server 117 is authorized to direct operation of a target IoT device(s) 105 indicated by the control message 137 in the manner indicated by the control message 137. In the case of a positive determination, the mapping subsystem 140 and the routing subsystem 120 can operate to generate and/or prepare any messaging for communication to the target IoT device 105, and the routing subsystem 120 can transmit the control message 137 (in its original, generated, or modified form) to control the target IoT device 105. A negative determination may indicate that the source customer is not contractually permitted to control the target IoT device 105 at all, that the source customer is not contractually permitted to control the target IoT device 105 in the requested manner, that the requested control operation is invalid for the identified target IoT device 105, etc. The routing protocol may indicate how to handle such a case, such as by ignoring the request, by returning a denial message to the source remote server 117, by escalating the request to another entity (e.g., forwarding to a different remote server 117) or in any other suitable manner.

In some embodiments, the routing protocols define primary and alternate routings. A particular routing tier assigned to a particular input device data stream 113 can define a primary communication technology and a secondary communication technology; and the routing subsystem 120 can be configured to transmit a corresponding output device data stream 133 (e.g., generated at least from the input device data stream 113) by transmitting in accordance with the primary communication technology when available, by in accordance with the secondary communication technology (e.g., and possibly a continuing hierarchy of alternate communication technologies) responsive to detecting that the primary communication technology is inoperable. For example, a customer can contract to have certain data communicated via a particular broadband network channel (e.g., fourth generation 4G LTE) whenever possible, and alternatively to have the data communicated over a particular narrow-band network channel (e.g., nb-IoT) when the primary network channel is not operational or otherwise unavailable.

Similarly, in some embodiments, the processing protocols define primary and alternate processing directives. In some implementations, a particular routing tier assigned to a particular input device data stream 113 identifies a remote processing server that is remote from the multi-tenant IoT gateway routing system 110, such as one of the remote servers 117. In accordance with the processing protocol, when the edge processing subsystem 155 is operational and available, the processing protocol directs the edge processing subsystem 155 to process the input device data stream 113; when the edge processing subsystem 155 is not operational or otherwise unavailable, the processing protocol directs remote processing of the input device data stream 113. For example, the mapping subsystem 140 and/or the routing subsystem 120 can detect that the edge processing subsystem 155 is unavailable, and can direct routing of the input device data stream 113 to the remote processing server identified by the processing protocol, and can send any suitable instructions to the remote processing server to enable remote processing of the input device data stream 113 by the remote server.

Figure 3:
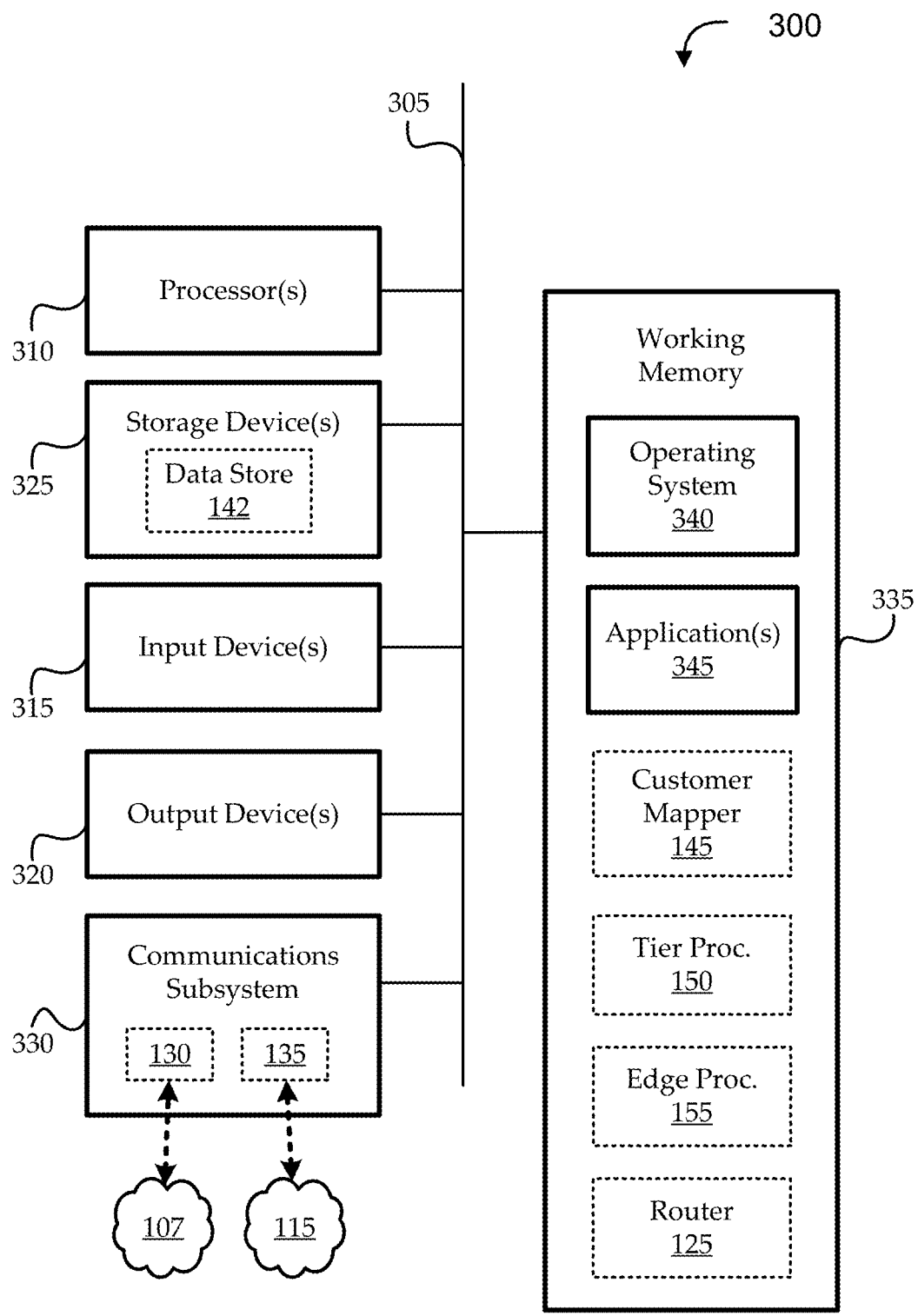
FIG. 3 provides a schematic illustration of one embodiment of a computer system that can implement various system components and/or perform various steps of methods provided by various embodiments.

Embodiments of the multi-tenant IoT gateway routing system 110, or components thereof, can be implemented on, and/or can incorporate, one or more computer systems, as illustrated in FIG. 3. FIG. 3 provides a schematic illustration of one embodiment of a computer system 300 that can implement various system components and/or perform various steps of methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, and/or the like; and one or more output devices 320, which can include, without limitation, a display device, a printer, and/or the like. In some implementations, the computer system 300 is a server computer configured to interface with additional computers (not with human users), such that the input devices 315 and/or output devices 320 include various physical and/or logical interfaces (e.g., ports, etc.) to facilitate computer-to-computer interaction and control.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 325 include the data store 142. For example, the customer device map and/or the customer tiering map are stored by the storage devices 325.

The computer system 300 can also include a communications subsystem 330, which can include, without limitation, a modem, a network card (wireless or wired), an infrared communication device, a wireless communication device, and/or a chipset (such as a Bluetooth™ device, an 302.11 device, a WiFi device, a WiMax device, cellular communication device, etc.), and/or the like. As described herein, the communications subsystem 330 supports multiple communication technologies. Further, as described herein, the communications subsystem 330 includes the radio interface 130 to facilitate exchange of data (e.g., input device data streams 113, and output device data streams 133, control messages 137, etc.) with one or more IoT networks 107, and the cloud interface 135 to facilitate exchange of data with one or more cloud networks 115.

In many embodiments, the computer system 300 will further include a working memory 335, which can include a RAM or ROM device, as described herein. The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the working memory 335 is used in conjunction with the one or more processors 310 to implement some or all of the router 125, the customer mapper 145, the tier processor 150, and the edge processing subsystem 155.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
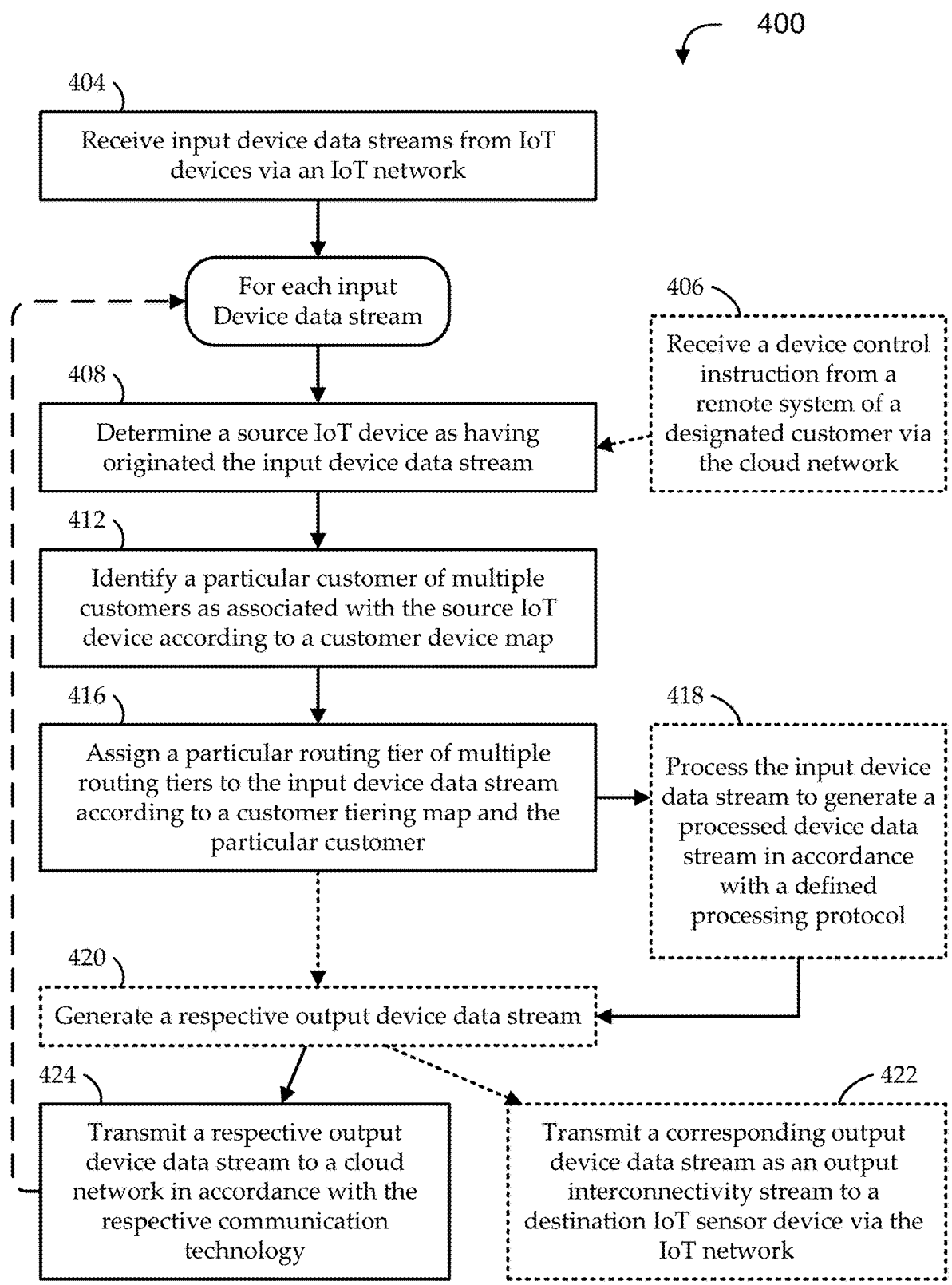
FIG. 4 shows a flow diagram of an illustrative method for IoT gateway routing, according to various embodiments.

Systems including those described above can be used to implement various methods. FIG. 4 shows a flow diagram of an illustrative method 400 for multi-tenant IoT gateway routing, according to various embodiments. Embodiments of the method 400 begin at stage 404 by receiving (e.g., by a multi-tenant IoT gateway routing system) one or more input device data streams from one or more IoT devices via an IoT network. The remaining stages of the method 400 can proceed, sequentially and/or concurrently, for each input device data stream. At stage 408, embodiments can determine a source IoT device of the IoT devices as having originated the input device data stream. At stage 412, embodiments can identify a particular customer of a plurality of customers as associated with the source IoT device according to a customer device map.

At stage 416, embodiments can assign a particular routing tier of a plurality of routing tiers to the input device data stream according to a customer tiering map and the particular customer. The particular routing tier can define a particular routing protocol for the input device data stream, thereby associating the input device data stream with a respective communication technology. In some embodiments, the particular routing tier assigned to a particular one of the input device data streams defines the particular routing protocol to indicate the respective communication technology as a primary communication technology and a secondary communication technology. In some embodiments, each of the routing tiers defines a respective one or more particular routing protocols, each associated with a respective IoT device type characterized by at least a relative frequency of data collection and a relative urgency of data communication.

In some embodiments, at stage 420, a respective output device data stream can be generated for the input device data stream by applying a transmission protocol associated with the respective communication technology and by scheduling the output device data stream for transmission in accordance with the particular routing tier. At stage 424, embodiments can transmit the respective output stream to the cloud network in accordance with the respective communication technology. In embodiments having routing protocols that define a primary and at least one secondary communication technologies, the transmitting can be in accordance with the secondary communication technology responsive to detecting that the primary communication technology is inoperable, and according to the primary communication technology otherwise.

In some embodiments, at stage 418, the particular routing protocol assigned to a particular one of the input device data streams includes a processing protocol. The processing protocol can include a directive to edge-process the particular one of the input device data streams. Accordingly, at stage 418, embodiments can process the particular one of the input device data streams locally (with an edge processor of the multi-tenant IoT gateway routing system) to generate a processed device data stream, the processing being responsive to the directive and in accordance with the processing protocol. In such embodiments, any corresponding output device data streams can be generated from the input device data stream by being generated from the processed device data stream. In some embodiments, the processing at stage 418 involves remote processing. For example, the processing protocol identifies a remote processing server remote from the multi-tenant IoT gateway routing system, and the processing can include: detecting whether the edge processor is operable prior to processing the particular one of the input device data streams; and routing the particular one of the input device data streams to the remote processing server for processing according to the processing protocol responsive to detecting that the edge processor is not operable (e.g., the processing the particular one of the input device data streams local to the multi-tenant IoT gateway routing system is performed only responsive to detecting that the edge processor is operable).

In some embodiments, at least one of the input device data streams is received as an input interconnectivity stream originating from a first of the IoT devices and destined for a second of the IoT devices. In such embodiments, the transmitting at stage 424 can be performed instead in accordance with stage 422, by transmitting a corresponding output data stream as an output interconnectivity stream to the second of the IoT devices via the IoT network. The output interconnectivity stream can be generated from the input interconnectivity stream in accordance with a routing tier assigned to the input interconnectivity stream, the routing tier authorizing interconnectivity between the first and second of the IoT devices.

In some embodiments, at stage 406, a device control instruction is received from a remote system of a designated customer via the cloud network. The device control instruction is destined for a designated (e.g., target) IoT device of the IoT devices. In such embodiments, some or all of stages 408-416 can be modified to determine, according to the customer device map, whether the designated customer is authorized to control operation of the designated IoT device. At stage 424 or 422, the device control instruction can be transmitted to the designated IoT device via the IoT network responsive to the determining that the designated customer is authorized to control operation of the designated IoT device (e.g., and/or that the control instruction is proper for the designated IoT device).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A multi-tenant Internet-of-Things (IoT) gateway routing system comprising:
    a routing subsystem configured to communicatively couple with a cloud network via a plurality of communication technologies, and to couple with a plurality of IoT devices via an IoT network, so as to:
        receive a plurality of input device data streams from the plurality of IoT devices via the IoT network; and
        transmit a plurality of output device data streams to the cloud network, each output device data stream generated from at least a respective input device data stream of the plurality of input device data streams, and each of at least a portion of the output device data streams being associated with a respective communication technology of the plurality of communication technologies and being transmitted in accordance with the respective communication technology;
    a data store having, stored thereon, a customer device map that maps each customer of a plurality of customers with a respective subset of the plurality of IoT devices, and a customer tiering map that maps the plurality of customers with a plurality of routing tiers; and
    a mapping subsystem coupled with the routing subsystem and the data store, and configured, for each input device data stream, to:
        determine a source IoT device of the plurality of IoT devices as having originated the input device data stream;
        identify a particular customer of the plurality of customers as associated with the source IoT device according to the customer device map; and
        assign a particular routing tier of the plurality of routing tiers to the input device data stream according to the customer tiering map and the particular customer, the particular routing tier defining a particular routing protocol for the input device data stream, thereby associating the input device data stream with the respective communication technology.

2. The multi-tenant IoT gateway routing system of claim 1, wherein the routing subsystem is further configured, for each input device data stream, to:
    generate a corresponding one of the output device data streams from the input device data stream, such that the corresponding one of the output device data streams is configured for transmission to the cloud network in accordance with the respective communication technology.

3. The multi-tenant IoT gateway routing system of claim 1, wherein:
    the particular routing tier assigned to a particular one of the input device data streams defines the particular routing protocol to indicate the respective communication technology as a primary communication technology and a secondary communication technology; and
    the routing subsystem is configured to transmit a particular one of the output device data streams that is generated from the particular one of the input device data streams by transmitting to the cloud network in accordance with the secondary communication technology responsive to detecting that the primary communication technology is inoperable, and is according to the primary communication technology otherwise.

4. The multi-tenant IoT gateway routing system of claim 1, further comprising:
    an edge processor configured to:
        receive a directive to edge-process a particular one of the input device data streams, the directive being received from the mapping subsystem according to the particular routing protocol associated with the particular input device data stream; and
        process the particular input device data stream to generate a processed device data stream, the processing being responsive to the directive and in accordance with a processing protocol indicated by the particular routing protocol,
    wherein one of the plurality of output device data streams is generated from the particular input device data stream by being generated from the processed device data stream.

5. The multi-tenant IoT gateway routing system of claim 4, wherein:
    the processing protocol identifies a remote processing server remote from the multi-tenant IoT gateway routing system; and
    the routing subsystem is further configured, responsive to detecting that the edge processor is inoperable, to route the particular input device data stream to the remote processing server for processing according to the processing protocol.

6. The multi-tenant IoT gateway routing system of claim 1, wherein each of the plurality of routing tiers defines a respective one or more particular routing protocols, each associated with a respective IoT device type characterized by at least a relative frequency of data collection and a relative urgency of data communication.

7. The multi-tenant IoT gateway routing system of claim 1, wherein, for at least one of the input device data streams, the routing subsystem is further configured to:
receive the at least one of the plurality of input device data streams via the IoT network as an input interconnectivity stream originating from a first of the IoT devices and destined for a second of the IoT devices; and
transmit a corresponding one of the output device data streams as an output interconnectivity stream to the second of the IoT devices via the IoT network, the output interconnectivity stream generated from the input interconnectivity stream in accordance with a routing tier assigned to the input interconnectivity stream by the mapping subsystem, the routing tier authorizing interconnectivity between the first and second of the IoT devices.

8. The multi-tenant IoT gateway routing system of claim 7, further comprising:
an edge processor configured to at least partially generate the output interconnectivity stream responsive to the input interconnectivity stream in accordance with a processing protocol identified by the routing tier assigned to the input interconnectivity stream, such that the output interconnectivity stream comprises a device control instruction to control operation of the second of the IoT devices.

9. The multi-tenant IoT gateway routing system of claim 1, wherein:
the routing subsystem is further configured to receive a device control instruction from a remote system of a designated customer of the plurality of customers via the cloud network, the device control instruction destined for a designated IoT device of the plurality of IoT devices;
the mapping subsystem is further configured to determine, according to the customer device map, whether the designated customer is authorized to control operation of the designated IoT device; and
the routing subsystem is further configured to transmit the device control instruction to the designated IoT device via the IoT network responsive to the mapping subsystem determining that the designated customer is authorized to control operation of the designated IoT device.

10. The multi-tenant IoT gateway routing system of claim 1, wherein the plurality of communication technologies comprises at least two of: a narrow-band IoT (nab-IoT) network technology; a long-term evolution (LTE) network technology, a wireless fidelity (WiFi) network technology, and an Ethernet network technology.

11. The multi-tenant IoT gateway routing system of claim 1, wherein the IoT network is a radio network operating in a frequency band of between 300 Megahertz to 3 Gigahertz.

12. An method for multi-tenant Internet-of-Things (IoT) gateway routing, the method comprising:
receiving, by a multi-tenant IoT gateway routing system, a plurality of input device data streams from a plurality of IoT devices via an IoT network; and
for each input device data stream:
determining, by the multi-tenant IoT gateway routing system, a source IoT device of the plurality of IoT devices as having originated the input device data stream;
identifying, by the multi-tenant IoT gateway routing system, a particular customer of a plurality of customers as associated with the source IoT device according to a customer device map;
assigning, by the multi-tenant IoT gateway routing system, a particular routing tier of a plurality of routing tiers to the input device data stream according to a customer tiering map and the particular customer, the particular routing tier defining a particular routing protocol for the input device data stream, thereby associating the input device data stream with a respective communication technology; and
transmitting, by the multi-tenant IoT gateway routing system, a respective output device data stream to a cloud network in accordance with the respective communication technology, the respective output device data stream generated from the input device data stream.

13. The method of claim 12, further comprising:
generating the respective output device data stream by applying a transmission protocol associated with the respective communication technology and by scheduling the respective output device data stream for transmission in accordance with the particular routing tier.

14. The method of claim 12, wherein:
the particular routing tier assigned to a particular one of the input device data streams defines the particular routing protocol to indicate the respective communication technology as a primary communication technology and a secondary communication technology; and
the transmitting is of the respective output device data stream that is generated from the particular one of the input device data streams by transmitting to the cloud network in accordance with the secondary communication technology responsive to detecting that the primary communication technology is inoperable, and is according to the primary communication technology otherwise.

15. The method of claim 12, wherein the particular routing protocol assigned to a particular one of the input device data streams comprises a directive to edge-process the particular one of the input device data streams by a local edge processor according to a particular processing protocol, and further comprising:
processing the particular one of the input device data streams to generate a processed device data stream, the processing being responsive to the directive and in accordance with the particular processing protocol,
wherein the output device data streams is generated from the particular one of the input device data streams by being generated from the processed device data stream.

16. The method of claim 15, wherein the processing protocol identifies a remote processing server remote from the multi-tenant IoT gateway routing system, and further comprising:
detecting whether the local edge processor is operable prior to processing the particular one of the input device data streams; and
routing the particular one of the input device data streams to the remote processing server for processing according to the processing protocol responsive to detecting that the edge processor is not operable, wherein the processing the particular one of the input device data streams is performed by the edge processor only responsive to detecting that the edge processor is operable.

17. The method of claim 12, wherein each of the plurality of routing tiers defines a respective one or more particular routing protocols, each associated with a respective IoT device type characterized by at least a relative frequency of data collection and a relative urgency of data communication.

18. The method of claim 12, wherein at least one of the plurality of input device data streams is received as an input interconnectivity stream originating from a first of the IoT devices and destined for a second of the IoT devices, and further comprising:
   transmitting a corresponding output data stream as an output interconnectivity stream to the second of the IoT devices via the IoT network, the output interconnectivity stream generated from the input interconnectivity stream in accordance with a routing tier assigned to the input interconnectivity stream, the routing tier authorizing interconnectivity between the first and second of the IoT devices.

19. The method of claim 18, further comprising:
generating the output interconnectivity stream responsive to the input interconnectivity stream in accordance with a processing protocol identified by the routing tier assigned to the input interconnectivity stream, such that the output interconnectivity stream comprises a device control instruction to control operation of the second of the IoT devices.

20. The method of claim 12, further comprising:
receiving a device control instruction from a remote system of a designated customer of the plurality of customers via the cloud network, the device control instruction destined for a designated IoT device of the plurality of IoT devices;
determining, according to the customer device map, whether the designated customer is authorized to control operation of the designated IoT device; and
transmitting the device control instruction to the designated IoT device via the IoT network responsive to the determining that the designated customer is authorized to control operation of the designated IoT device.

* * * * *